May 17, 1960 H. E. WALDRON 2,936,723
ROOFING CONSTRUCTION
Filed March 6, 1957
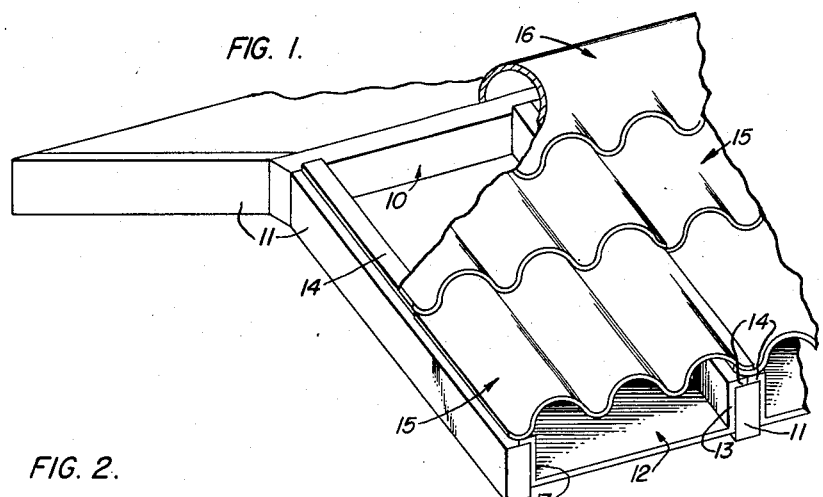
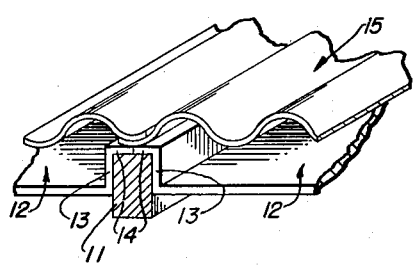
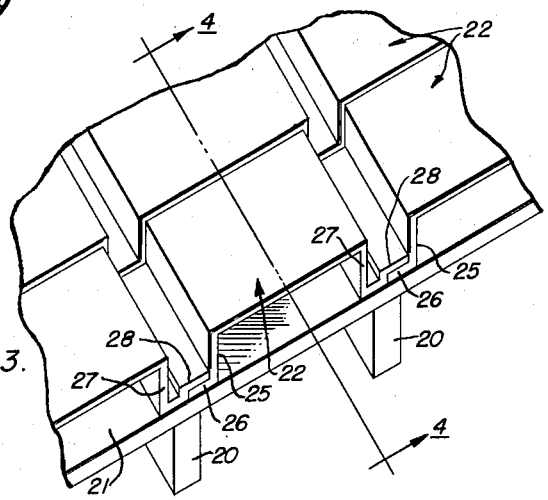
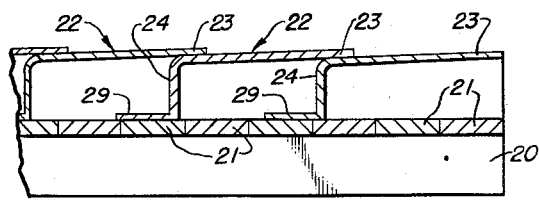
INVENTOR.
HARRY E. WALDRON
BY

United States Patent Office 2,936,723
Patented May 17, 1960

2,936,723

ROOFING CONSTRUCTION

Harry E. Waldron, St. Petersburg, Fla.

Application March 6, 1957, Serial No. 644,368

2 Claims. (Cl. 108—10)

This invention relates to a roofing construction and has special reference to a roofing construction including fibre glass panels so constructed and arranged as to minimize the transfer of heat therethrough.

More particularly, this invention relates to a roofing construction having a plurality of equally spaced rafters with means for effecting a continuous cover therefor, and a plurality of fibre glass panels overlying the cover means, the panels having overlapping edge and end portions with a major portion of the area of each of the panels lying in a spaced relation with the cover means.

In the present invention, the panel is formed of a laminate consisting of layers of materials of continuous construction, preferably alternate layers of glass mat and fibre glass cloth, permanently bound to each other by means of resins. The laminate may preferably be made by impregnating or saturating the glass material of continuous construction type with a high impact strength liquid resin; laying up or stacking individual plies of the impregnated material in the desired form, and bonding the plies together by converting the resin into a solid state with or without the application of heat and pressure to form a laminated fibre glass plastic panel.

In a roofing construction it is desirable to minimize the transfer of heat therethrough and aside from the construction and arrangement of the panel per se, the thermal properties of the fibre glass plastic panel are excellent, having low heat conductivity and being superior as heat insulators. Moreover, in a continuous expanse of interconnected overlapping panels, the fibre glass plastic material has a favorable coefficient of expansion and good dimensional stability in relation to temperature changes.

In addition to its thermal properties, the fibre glass plastic material is light in weight, about half the weight of aluminum and, therefore, very substantially less than tile, slate, and other of the more permanent materials currently used in roofing constructions. Further, the material satisfies the requirement of permanent good appearance. There may be an unlimited range of colors, patterns and designs with varying surface textures.

The use of a fibre glass plastic material precludes the necessity for using externally disposed metal fastenings common to the usual roofing constructions, the overlapping portions being capable of being bonded permanently by solvents or the like. While I have referred hereinabove to a fibre glass plastic laminate, it will be understood that a laminate may consist of more than one type filler and may include an asbestos or a synthetic organic material having the same desirable properties for a roofing construction, including specific decorative effects.

One of the objects of this invention is to provide a roofing construction of the type indicated above which is reasonable in its original cost as well as in its maintenance cost, is comparatively light in weight and yet is durable.

Another object of this invention is to provide a roofing construction of the character above mentioned in which the material, construction and arrangement is such as to minimize the transfer of heat therethrough.

A still further object of this invention is to provide a roofing construction as hereinbefore recited wherein the deteriorating influences of the elements are minimized.

Other objects and advantages will hereinafter be more fully described, and for a more complete understanding of the characteristic features of this invention, reference may be had to the following description when taken together with the accompanying drawings, in which latter:

Figure 1 is a perspective view of a fragmentary portion of a roofing construction embodying one form of the invention of this application;

Fig. 2 is an enlarged perspective view of a portion of Figure 1;

Fig. 3 is a perspective view of a fragmentary portion of a roofing construction embodying a second form of the invention of this application; and Fig. 4 is a sectional view taken on the line 4—4 of Fig. 3.

Referring to the drawing and more particularly to Figures 1 and 2 thereof, this invention is shown as comprising a roofing construction having a ridge pole 10 and a plurality of rafters 11 extending therefrom on each side thereof, the rafters being substantially equally spaced along said ridge pole 10.

In order to provide a continuous substantially air-tight cover means with said rafters 11, a plurality of preferably channel-shaped plates 12 are secured to and between said rafters, the arms 13 being integral with the web portion of the plates and fitting between the rafters and having outwardly extending flanges 14 on the free edges thereof which overlie the upper edges of the rafters. While the width of the plates 12 are determined by the standard distance between rafters, the length thereof may be determined by convenience in use. In any event, the plates are arranged so that the end edges are in an abutting relation.

So that the roofing construction has a minimum of heat transfer therethrough, a plurality of fibre glass panels 15 are so constructed and arranged as to overlie said plates 12 in a spaced relation with the web portions of the plates 12 to form continuous passageways preferably throughout the length of said rafters. The panels are shown as being of undulated form, having overlapping edge portions supported on the flanges 14 of the plates 12. The undulations of adjacent panels are coextensive, with an end of one panel overlying the end of an adjacent panel.

The ridge pole 10 is housed by a plurality of overlapping open ended elements forming a continuous conduit 16 providing a vent communicating at each end thereof with the atmosphere. The passageways formed lengthwise between the rafters and bounded by the plates 12 and the panels 15 communicate at their upper ends with the vent formed by the housing 16, the lower ends of the passageways communicating with the atmosphere.

As aforesaid, the panels 15 are preferably formed of fibre glass. The channel-shaped plates 12 may also be formed of fibre glass although because they are not directly exposed to the elements, they may be formed of other materials such as metal or fibre board. However, the passageways formed by the panels and plates vented in the manner described above provide for the free circulation of air which minimizes heat transfer through the roofing construction.

Referring now to Figs. 3 and 4, the embodiment disclosed therein comprises spaced rafters 20 of the type just above described having a continuous substantially air-tight cover formed therewith. In this instance, the cover may preferably be of edge-abutting boards 21 extending in long lengths to tie a substantial number of rafters in position.

A plurality of panels 22 preferably of fibre glass are so constructed and arranged as to completely overlie the cover formed by the boards 21. Each panel is shown as having integral edge portions 23 and at one end a bridging member connecting the edge portions to form a closed end 24, thus providing a substantially scoop-shaped panel. Upon assembly the open end 23 of one panel overlaps the closed end 24 of its adjacent panel to provide that a major portion of the area of each panel lie in a spaced relation with the cover so as to minimize the transfer of heat therethrough.

The vertical edge portions 25 on one side of each channel have angularly formed flanges 26 for resting on the boards 21 while the vertical edge portions 27 on the other side of each channel have angularly formed flanges 28 overlying flanges 26. The closed end 24 of the scoop-shaped panel has an angularly extending flange 29 for engaging the boards 21 for support thereon and for connection therewith.

In both embodiments of this invention, above described, the panels are recited as having inter-connected edge portions and overlapping end portions. By reason of the panels being formed of a laminate consisting of layers of materials permanently bonded together by means of resins, it will be understood that a permanent or fixed connection or relation between the edge portions and, if desired, the end portions may be effected by means of solvents, the application of heat and pressure, or like means without resorting to nails or other metal fastenings or such materials as might be effected by the deteriorating influences of the elements. Thus, the panels may be bonded at all inter-connecting and overlapping portions to form an unbroken shell-like integument or covering.

While but two embodiments of this invention are herein shown and described, it is urged that still other modifications will be apparent to those skilled in the art without departing from the spirit and scope of this invention and, therefore, that the same is to be limited only by the scope of the prior art and the appended claims.

I claim:

1. In a roofing construction, the combination of a plurality of equally spaced rafters extending from a ridge pole, a plurality of channel-shaped plates having flange portions secured to said rafters and web portions integral with said flange portions and suspended between said rafters to effect a continuous substantially air-tight cover therewith, a plurality of fiber glass reinforced plastic panels spaced from and substantially parallel to said web portions, each of said panels being substantially equal in width to the distance between centers of adjacent rafters, said plates having permanently bonded overlapping end portions, interconnected permanently bonded edge portions integral with said panels and secured over said rafters, said edge portions supporting said panels in said spaced relation with said web portions to form a plurality of unobstructed passageways between said spaced rafters, and a continuous open ended conduit housing said ridge pole, said conduit communicating with the atmosphere and providing a vent connecting with said passageways to provide for the free circulation of air and thus to minimize the transfer of heat through said plates.

2. In a roofing construction, the combination of a plurality of equally spaced rafters extending from a ridge pole, a plurality of channel-shaped plates having flange portions secured to said rafters and web portions integral with said flange portions and suspended between said rafters to effect a continuous air-tight cover therewith, a plurality of undulated fiber glass reinforced plastic panels spaced from and substantially parallel to said web portions, each of said panels being of a width substantially equal to the distance between centers of adjacent rafters, said panels having permanently bonded overlapping end portions with the undulations of adjacent panels being coextensive, edge portions integral with said panels and secured over and aligned with said rafters, said edge portions supporting said panels in said spaced relation with said web portions and being interconnected and permanently bonded to provide an unbroken shell-like integument spaced from said web portions thereby forming a plurality of unobstructed passageways between said rafters, and a continuous open ended conduit housing said ridge pole, said conduit communicating with the atmosphere and providing a vent connecting with said passageways to provide for the free circulation of air and thus to minimize the transfer of heat through said plates.

References Cited in the file of this patent

UNITED STATES PATENTS

| | | |
|---|---|---|
| 135,044 | Morden | Jan. 21, 1873 |
| 1,028,725 | Hodgson | June 4, 1912 |
| 1,570,839 | Joaquin | Jan. 26, 1926 |
| 1,572,377 | Blair | Feb. 9, 1926 |
| 1,579,179 | Teixeira | Mar. 10, 1926 |
| 1,714,800 | Minnec | May 28, 1929 |

OTHER REFERENCES

Architectural Record, June 1944, pp. 103–108.
Engineering News Record, Mar. 15, 1956, p. 27.
House and Home, September 1956, p. 129.